Figure 1:
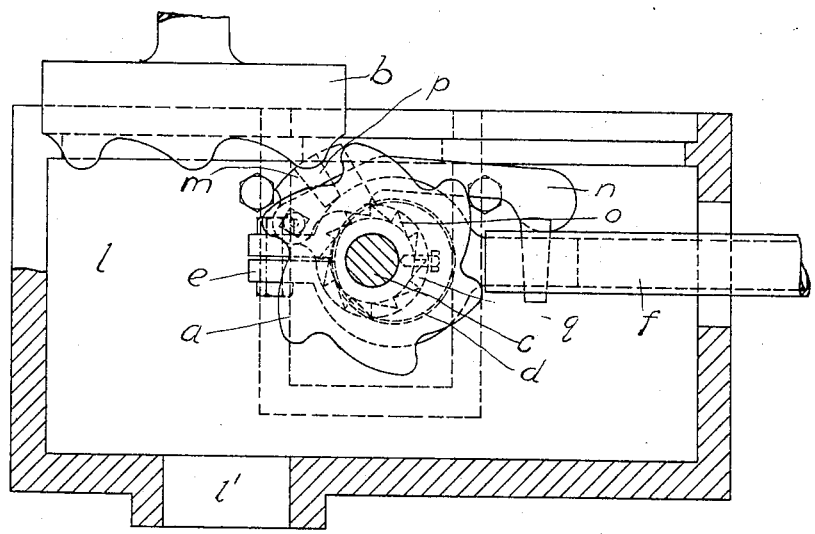

No. 784,657. PATENTED MAR. 14, 1905.
R. C. BULLOUGH.
MEANS FOR OPERATING RAILWAY SWITCHES.
APPLICATION FILED JULY 20, 1904.

2 SHEETS—SHEET 1.

WITNESSES:
A. V. A. B. McCauley.
Loretto O'Connell

INVENTOR
R. C. Bullough,
BY
Geo. H. Parmelee,
his ATTORNEY.

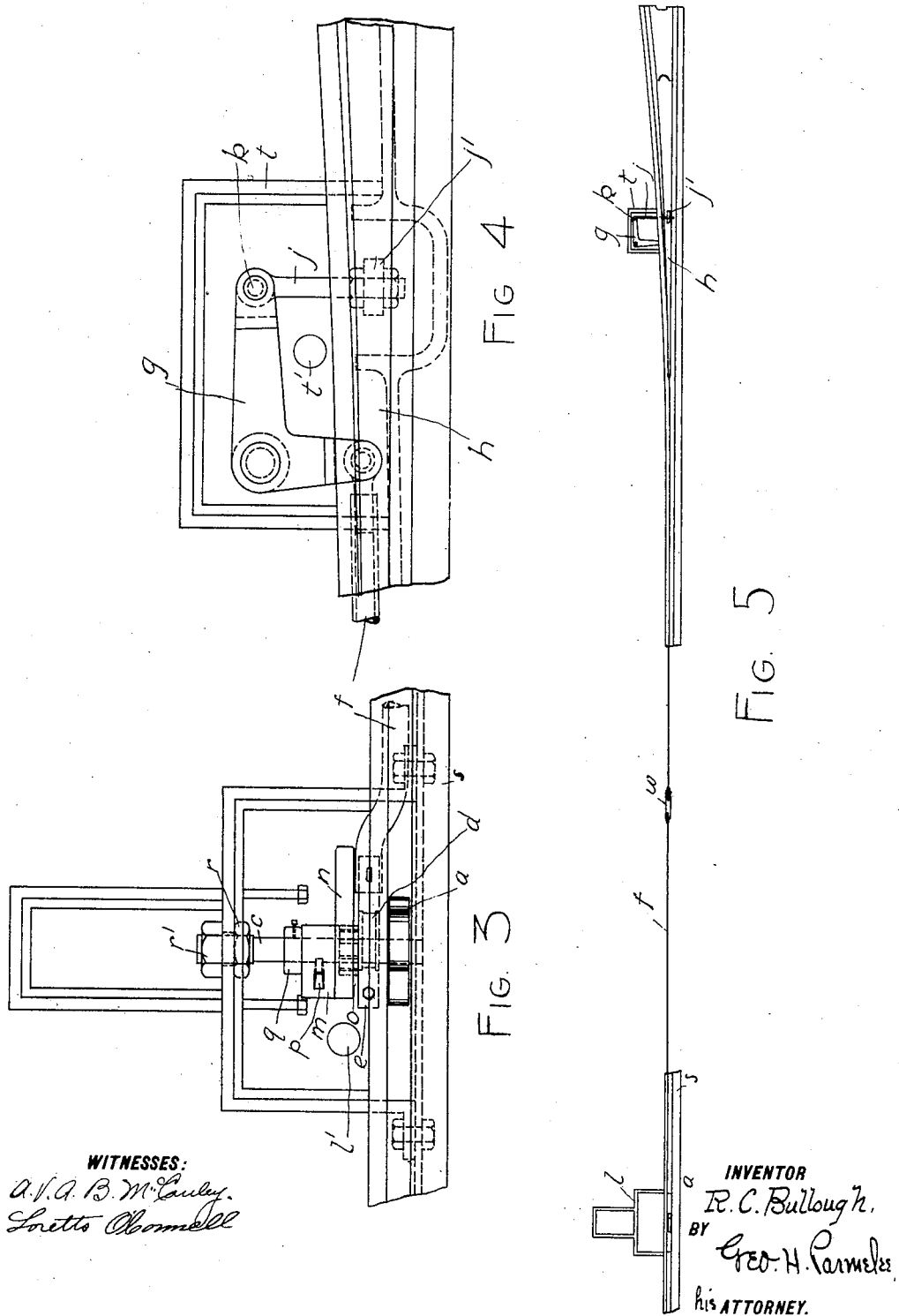

No. 784,657.

Patented March 14, 1905.

UNITED STATES PATENT OFFICE.

ROBERT CROSSLEY BULLOUGH, OF MANCHESTER, ENGLAND.

MEANS FOR OPERATING RAILWAY-SWITCHES.

SPECIFICATION forming part of Letters Patent No. 784,657, dated March 14, 1905.

Application filed July 20, 1904. Serial No. 217,309.

*To all whom it may concern:*

Be it known that I, ROBERT CROSSLEY BULLOUGH, of Manchester, in the county of Lancaster, England, have invented a new and useful Improvement in Means for Operating Railway-Switches, of which the following is a full, clear, and exact description, reference being had to the accompanying drawings, which form a part of this specification.

This invention relates to apparatus for moving or altering the positions of tramway or railway point-tongues, the apparatus being capable of being actuated from or by an approaching car or vehicle. Such apparatus comprises as an essential feature a wheel or other equivalent rotatable part which is capable of being moved through half a revolution, or an angle of one hundred and eighty degrees, upon the passage of a vehicle by some convenient device attached to the vehicle. This operating-wheel or the like has teeth or projections and is formed with a crank-pin, eccentric, or equivalent, which is connected by suitable rod or other gearing with the point-tongue which is to be operated. The wheel is always rotated or partly rotated in the same direction on the approach or passage of a car, and when desired, and the crank-pin, eccentric, or the like is so disposed that by one semirotation of the wheel the point-tongue is moved in one direction and by the next semirotation the point-tongue is moved in the reverse direction. The upper part of the periphery of the operating-wheel is preferably placed in the bottom of the groove in the rail, in which the groove and, if desired, the guard also is or are cut away so that the operating device from the car may come into efficient contact with the wheel. The wheel itself may be directly operated from the vehicle, or it may be geared to some other wheel or part which is directly operated.

The device on the car for engaging with or effecting the semirotation of the operating-wheel may consist of a plunger, hook, tooth, rack, or other part which may at will be depressed by the driver into the groove to engage with and operate the wheel. This plunger or the like may be flexible or be provided with springs, so as to avoid unnecessary shocks. One or more may be provided at each end of the car for engagement with either rail.

The mechanism for transmitting the motion of the wheel to the point-tongue consists of a sliding or longitudinally reciprocable connecting-rod which is connected to the crank-pin, eccentric, or equivalent on the wheel and at the other end to the point-tongue. The connection of this rod and the tongue of the point may be through or by means of any suitable device—as, for example, a bell-crank lever. With such a lever and by disconnecting one of its limbs it will be possible at any time to effect the operation of the point by hand should this be required.

By the employment of the connecting devices described the operating-wheel may be placed at any required convenient distance in advance of the point so that the driver of the car before reaching the point can see whether he has operated it correctly. The driver or other official on the car or vehicle has only to depress or otherwise bring into action the operating device on the car when he sees that the point he is approaching is wrongly set for him.

The accompanying drawings illustrate how my improved apparatus is constructed and disposed.

Figure 2:
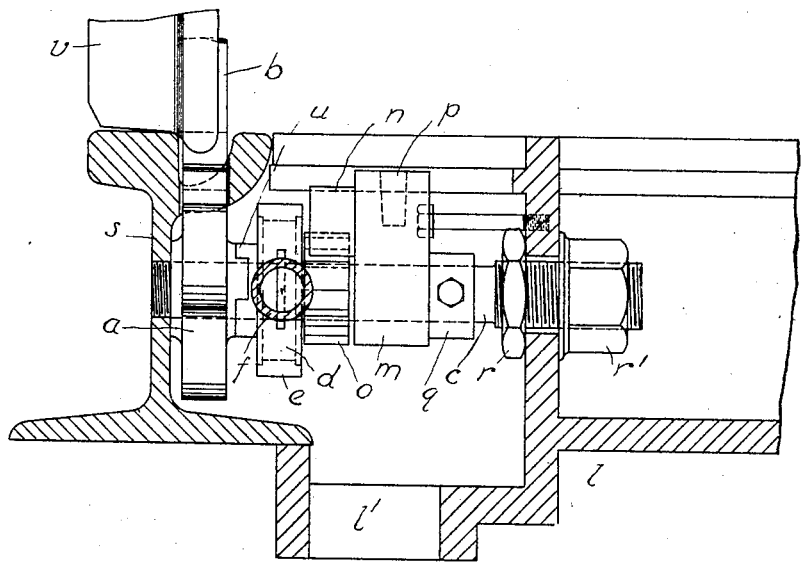

Figure 1 represents in vertical section a containing box for the operating-wheel arranged by the side of a rail and also shows such operating-wheel and some of its connected parts. Fig. 2 shows a cross-section of the same box and the rail at right angles to Fig. 1 and shows the operating-wheel and other parts on its shaft in elevation. Fig. 3 represents in plan the parts and mechanism shown in Figs. 1 and 2. Fig. 4 illustrates in plan the point-tongue and its operating connection. Fig. 5 shows in plan, on a smaller scale, a length of tramway-line and the relative positions occupied by the operating-wheel, the rail, and the point-tongue. In Figs. 1, 2, 3, and 4 the covers of the boxes are shown as removed.

Similar parts are indicated by similar letters of reference where they occur in the different figures.

*a* is the operating-wheel, capable of being turned a half-revolution by each passage of the rack *b* in engagement with it. This rack is attached to the car or vehicle and may be normally lifted or raised and be depressed when desired to the position shown in Fig. 1 of the drawings, where it is just about to make engagement with the wheel *a*. On the same shaft *c* as the wheel *a* and attached to the latter, so as to rotate therewith, is an eccentric disk or wheel *d*, surrounded by a strap or collar *e*, to which is attached the connecting-rod *f*. In the drawings this rod is shown in its extreme forward position, so that the point-tongue *h* is held over to pass a car on the main track, as illustrated in Fig. 5. Upon the passage of the rack *b* in engagement with the wheel *a* the latter makes a half-revolution, the eccentric disk makes a corresponding half-revolution, and the rod *f* is moved to its extreme rear or other position, thus pulling the point-tongue over to the opposite position. A further half-revolution of the wheel from the rack of the next actuating-car restores the parts to the positions illustrated. The other end of the rod *f* is connected to one limb of a bell-crank lever *g*, the other limb of which is connected directly to the point-tongue *h* by a rod *j*. To effect this connection, the tongue may have an inferior projection *j'*, which passes through a slot in the point box or casing, so that the rod *j* may be directly connected to it. Thus as the rod *f* moves backward or forward the point-tongue is moved to the right or to the left.

In case any of the mechanism should go wrong or be broken or should it be desired for any other reason the point-tongue *h* may be directly operated by hand in the usual manner. To permit this, it is only necessary to remove one of the jointing pins or pivots in the bell-crank lever *g*—for example, the pin *k*—or the point can be operated by hand at any time it is required from the box *l*, which contains the operating-wheel and its accessories.

Upon the shaft *c* is placed a rotatable sleeve or collar *m*, carrying a pawl *n* to engage with a ratchet-wheel *o*, secured to the eccentric disk *d*. The collar or sleeve *m* is formed with a part containing a box or recess *p*, or it is otherwise similarly formed so that intermittent alternate angular motion may be given to it by any suitable implement from above when the cover of the box *l* is removed. When the required movements have been given to the pawl and the ratchet-wheel, the eccentric disk is moved sufficiently to reverse the position of the point-tongue.

*q* is a sleeve fixed upon the shaft *c*, which permits the rotation of the different parts *a*, *d*, and *m* upon the shaft, but which restrains their axial movement along the shaft. This latter is preferably fixed and stationary and is secured in place by nuts *r r'* to the face of the box *l*, the other end of the shaft engaging with or penetrating the web of the rail *s*.

Should the wheel *a* be damaged or require withdrawing or replacing, the shaft *e* may be withdrawn to the right of Fig. 2 upon the nuts *r r'* being unscrewed until the wheel can be removed or replaced. To allow the wheel to be easily withdrawn, it may engage with the eccentric disk by jaws *u*.

The rack *b* may be depressed or operated from the car in any well-known or suitable manner. The lower face of the rack may be shaped to the contour of the face of the rail *a*, so that it may be used as a scraper or cleaner when desired.

The boxes *l* and *t* may be furnished with drainage-outlets *l'* and *t'*.

Any convenient method or means may be employed for adjusting the length of the rod *f* or its attachments to the lever *g* or the eccentric disk so as to get a perfect movement of the point-tongue. For example, a turnbuckle, such as *w* and as shown in Fig. 5, may be inserted at any suitable point in the length of the rod so that by rotating it its right and left hand screwed ends may engage with the corresponding ends of the parts of the rod and lengthen or shorten them, or the end of the rod *f* may be attached to the limb of the lever *g* by similar means to those shown in connection with the rod *j* and the point-tongue.

*v* indicates a car-wheel.

If desired, the rod *j* or some part thereof or the devices by means of which it is connected with the point-tongue may have springs interposed in them, which while normally strong enough to compel the tongue to move with the rod *j* would yet permit sufficient independent movement of the tongue to allow the point-tongue to give way if a car passed in the wrong direction over the point using it as a trailing point with the tongue wrongly set. With coupled points when the tongues are mechanically connected so that they move together one such set of devices or apparatus is sufficient to move both tongues.

With apparatus constructed as before described the following advantages are obtained: The driver of an approaching car has complete control over the points and at any required distance therefrom, as the actuating device may be placed any suitable distance in advance of the points so that the driver may see that the tongue occupies its correct position before his car reaches the point. The operation of the points is simply mechanical, and the mechanism being very simple there is nothing—as, for example, springs—to get out of order. The mechanism is very durable and will last a long time without renewals. There will be no "kicking" of switches, causing "split" tongues, with the consequent derailment of cars, as the tongue is always brought or sent "home" even if it be loose at the heel. The boxes in which the different parts are shown act or may act also as drain-boxes, and they are so disposed that the apparatus is accessible without the necessity for opening the pavement. If desired, a point-tongue actuated by the mechanism described can be moved by hand at any time, as herein set forth. "Mate-points" may be dispensed with and switches (coupled) be used on both rails of the track instead. The rack or the like upon the car may also be used, when suitably shaped, for cleaning the rail-head or groove, or both.

Having now particularly described and ascertained the nature of my said invention and in what manner the same is to be performed, I declare that what I claim is—

1. In apparatus for operating a point-tongue for tramways or railways, the combination of an operating device attached to a car, a wheel capable of being turned a half-revolution upon engagement with the said operating device, said wheel being journaled to rotate in a vertical plane, an eccentric or crank connected to the wheel, a reciprocable rod attached at one end to the crank or eccentric, a point-tongue, and means for connecting the rod and the point-tongue.

2. Apparatus for operating a point-tongue in tramways or railways, consisting of a wheel journaled to rotate in a vertical plane and capable of being turned a half-revolution upon engagement with an operating device carried by the car, an eccentric or crank connected to the wheel, a reciprocable rod connected to the crank or eccentric and means for transmitting the motion of the rod to the point-tongue in such a manner that as the rod is moved alternately in opposite directions the point-tongue is moved from one position to the other, substantially as described.

3. In apparatus for operating a point-tongue in tramways or railways, a wheel journaled to rotate in a vertical plane upon engagement with an operating device carried by a passing car, an eccentric or crank connected to such wheel and means by which the motion of the wheel is transmitted to cause the required motion of the point-tongue, substantially as described.

4. The combination with a movable switch tongue or point, of a toothed wheel journaled in a vertical plane and having a portion of its toothed periphery projecting up into the flange-groove of the adjacent fixed track-rail, and a connecting-rod forming an operating connection between the said wheel and the movable tongue or point.

5. The combination with a movable point-tongue, of a member journaled to rotate in a vertical plane and having its peripheral portion extending up through the bottom of the groove or floor of the rail, means carried by the car for imparting a partial rotation to the said member, and operating connections between said member and the point-tongue, substantially as described.

6. The combination with the rotatable member and the operating connections between the same and the point-tongue, of pawl-and-ratchet devices whereby said member may be manually operated, substantially as described.

In testimony whereof I have affixed my signature in presence of two witnesses.

ROBERT CROSSLEY BULLOUGH.

Witnesses:
WILLIAM GEO. HEYS,
JOHN O'CONNELL.